US006552513B1

(12) United States Patent
Li

(10) Patent No.: US 6,552,513 B1
(45) Date of Patent: Apr. 22, 2003

(54) PORTABLE CHARGING DEVICE FOR COUPLING PORTABLE PHONES TO VEHICLE AND FOR ATTACHING PORTABLE PHONES TO USER

(75) Inventor: Kai Man Li, Tai Po (HK)

(73) Assignee: Canhold International Ltd., Hong Kong (HK)

( * ) Notice: Subject to any disclaimer, the term of this patent is extended or adjusted under 35 U.S.C. 154(b) by 0 days.

(21) Appl. No.: 10/045,378

(22) Filed: Jan. 15, 2002

(51) Int. Cl.$^7$ ............................................... H01M 10/46
(52) U.S. Cl. ....................................... 320/107; 320/114
(58) Field of Search .............................. 320/107, 110, 320/111, 112, 113, 114, 115; D13/103, 107, 108; 307/150; 429/96–100

(56) References Cited

U.S. PATENT DOCUMENTS 5,333,176 A * 7/1994 Burke et al.
6,035,221 A * 3/2000 Snyder et al.

* cited by examiner

Primary Examiner—Edward H. Tso
(74) Attorney, Agent, or Firm—Charles E. Baxley

(57) ABSTRACT

A portable charging device includes a housing having a space for receiving the mobile phone and having one or more prongs for plugging to the mobile phone, a circuit board secured in the housing, a speaker coupled to the circuit board for generating sound waves, and a battery engaged in the housing and coupled to the circuit board for energizing the speaker. The mobile phone may be easily carried by the users with the housing, and may be easily secured to the vehicle and may be electrically coupled to the battery of the vehicle via the circuit board.

1 Claim, 8 Drawing Sheets

PORTABLE CHARGING DEVICE FOR COUPLING PORTABLE PHONES TO VEHICLE AND FOR ATTACHING PORTABLE PHONES TO USER

BACKGROUND OF THE INVENTION

1. Field of the Invention

The present invention relates to a charging device, and more particularly to a portable charging device for portable phones and mobile phones.

2. Description of the Prior Art

Typical charging devices for portable phones and mobile phones are providing for charging the portable phones and mobile phones at home, and may not be carried outdoors with or by the users, and also may not be coupled to the vehicle batteries or the other power suppliers. The users should prepare one charging device for charging the portable phones and mobile phones at home, and the other charging device for charging the portable phones and mobile phones in the vehicle or the like. In addition, the users have to prepare a bag or the like for receiving and for carrying the portable phones or the mobile phones.

The present invention has arisen to mitigate and/or obviate the afore-described disadvantages of the conventional charging devices for portable phones and mobile phones.

SUMMARY OF THE INVENTION

The primary objective of the present invention is to provide a portable charging device for receiving and carrying the portable phones or mobile phones.

The other objective of the present invention is to provide a portable charging device for allowing the portable phones or mobile phones to be charged at home and in the vehicles.

In accordance with one aspect of the invention, there is provided a portable charging device for mobile phones, the portable charging device comprising a housing including a space for receiving the mobile phone, and including at least one prong for plugging to the mobile phone, a circuit board secured in the housing, a speaker coupled to the circuit board for generating sound waves, and a battery engaged in the housing and coupled to the circuit board for energizing the speaker. The mobile phone may be easily carried by the users with the housing, and may be easily secured to the vehicle by a bracket or the like.

The circuit board includes a socket provided therein for coupling to a power supply of a vehicle. A plug is further provided and coupled to the socket of the circuit board for plugging to a socket of the vehicle and for allowing the portable charging device to be electrically coupled to the battery or the electric power of the vehicle.

The circuit board includes two conductors coupled thereto and engaged with the battery for electrically coupling the battery to the circuit board.

The housing includes a back portion, a cover secured to the back portion of the housing and having an opening formed therein for receiving the speaker and for allowing the sound waves generated by the speaker to be heard through the opening of the cover.

The housing includes a bottom portion having a seat extended forward therefrom, and two sides each having a flap extended forward therefrom, for forming a space between the seat and the flaps and for receiving the mobile phone. The housing includes a pad secured to the housing and two pads secured to the flaps for engaging with and for protecting the mobile phone.

A stay is further provided and pivotally secured to the housing for tiltedly supporting the mobile phone on a supporting surface, and a clip may further be provided for securing the housing to a user.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
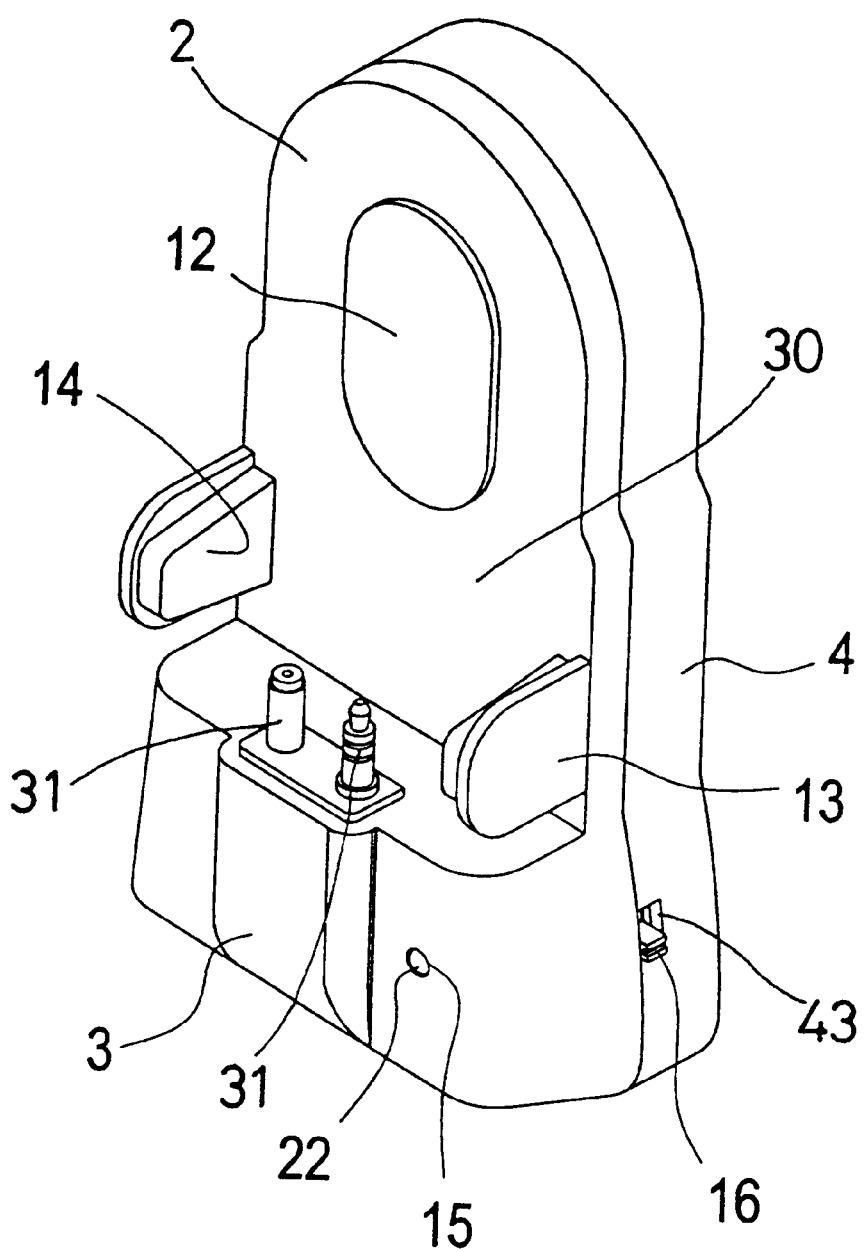
FIG. 1 is a perspective view of a portable charging device in accordance with the present invention.
Figure 2:
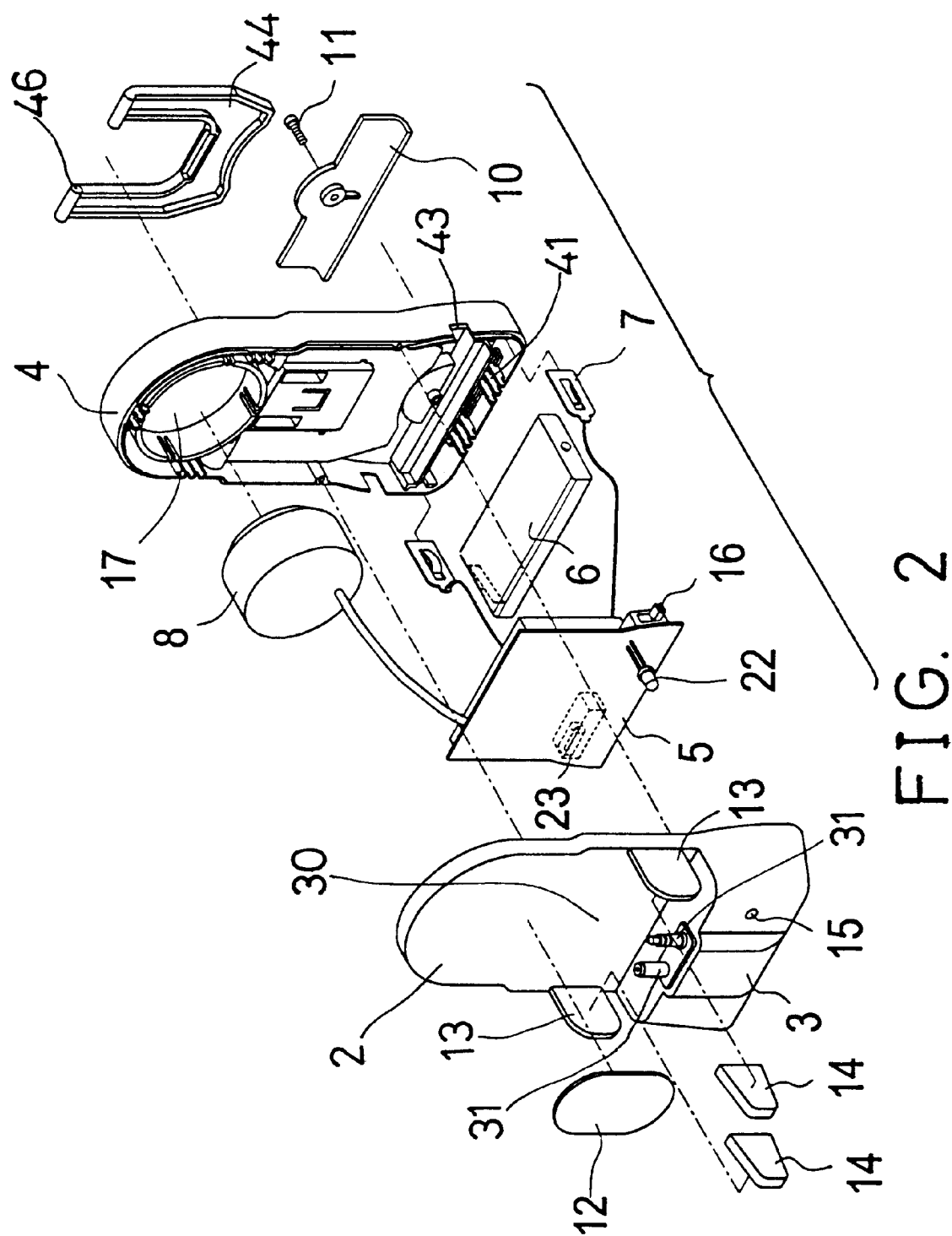
FIG. 2 is an exploded view of the portable charging device.
Figure 3:
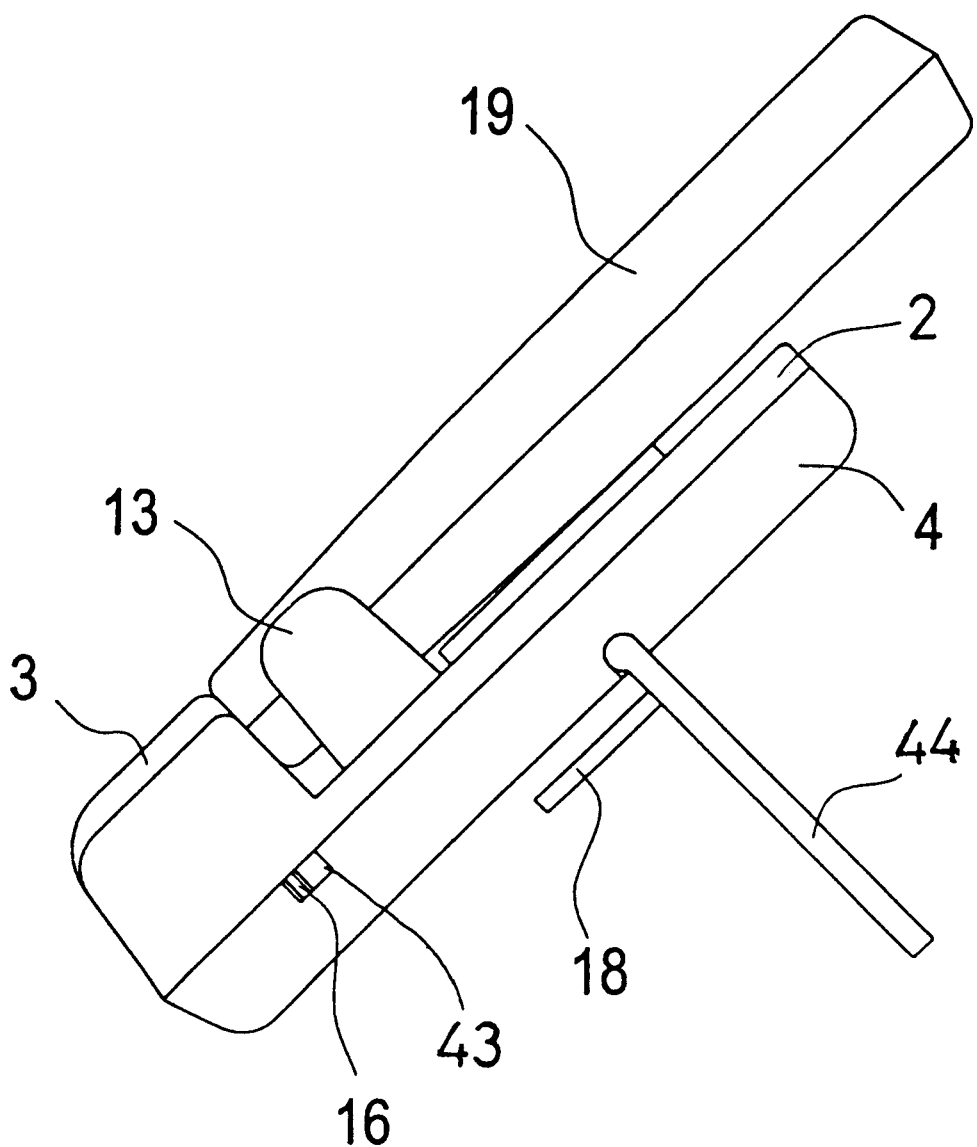
FIGS. 3, 4 are plan views illustrating the operation of the portable charging device.

Referring to the drawings, and initially to FIGS. 1 and 2, a portable charging device in accordance with the present invention is provided for receiving and charging the portable phones or the mobile phones and comprises a housing 2 having a cover 4 secured or attached onto the rear or back portion thereof with detachable latches, fasteners, or even solidly secured together by welding processes. The housing 2 includes a seat 3 extended forward from the bottom or the lower portion thereof, and includes a pair of flaps 13 extended forward from the sides and the middle portion thereof for forming or defining a space 30 therebetween and for receiving a portable or mobile phone 19 therein. A pad 12 may be attached to the housing 2 and the other two pads 14 may be attached to the flaps 13 for engaging with and for protecting the portable or mobile phone 19 from being damaged or scratched or scrubbed by the flaps 13 or the other objects.

The seat 3 includes an orifice 15 formed therein, and includes one or more prongs 31 extended therefrom, such as extended inward of the space 30 of the housing 2 for plugging into the portable or mobile phone 19 (FIGS. 3–7). A circuit board 5 is secured in the housing 2 or in the cover 4, and includes a light device 22, such as a light bulb 22 or the like attached thereto and engaged in the orifice 15 of the seat 3 for generating a signal light or a flash light, and for allowing the light to be seen through the orifice 15 of the seat 3. A speaker 8 or the like is coupled to the circuit board 5 and is engaged in an opening 17 of the cover 4, for generating sounds or sound waves or the like, and for allowing the sound waves to be heard through the opening 17 of the cover 4.

A battery 6 may be engaged into the housing 2 via a lower or a bottom channel 41 of the cover 4, and may be coupled to the circuit board 5 with one or more conductors 7 for energizing the light device 22, the speaker 8, and the other electric facilities. A cap 10 may be secured to the cover 4 with fasteners 11 for enclosing the cover 4 and for retaining the battery 6 within the cover 4. A socket 23 is secured to the circuit board 5 for coupling to the socket 20 of the vehicle (FIG. 7) with a cable and a plug 25, and for allowing the battery 6 and/or the portable or mobile phone 19 to be charged or energized by the power or the battery of the vehicle. The plug 25 may include a light device 21 that may be energized for indicating that the plug 25 is electrically coupled to the socket 20 of the vehicle.

The circuit board 5 includes a switch 16 attached thereto or provided therein and may be used to control that the battery 6 and/or the portable or mobile phone 19 to be charged and/or energized by the power or the battery of the vehicle. The switch 16 is partially extended outward of an aperture 43 of the cover 4, for allowing the switch 16 to be actuated or operated by the users. The switch 16 may also be used to control that the portable or mobile phone 19 be energized or charged by the battery 6 when the circuit board 5 has not been electrically coupled to the battery or the power of the vehicle via the socket 20 of the vehicle.

Figure 5:
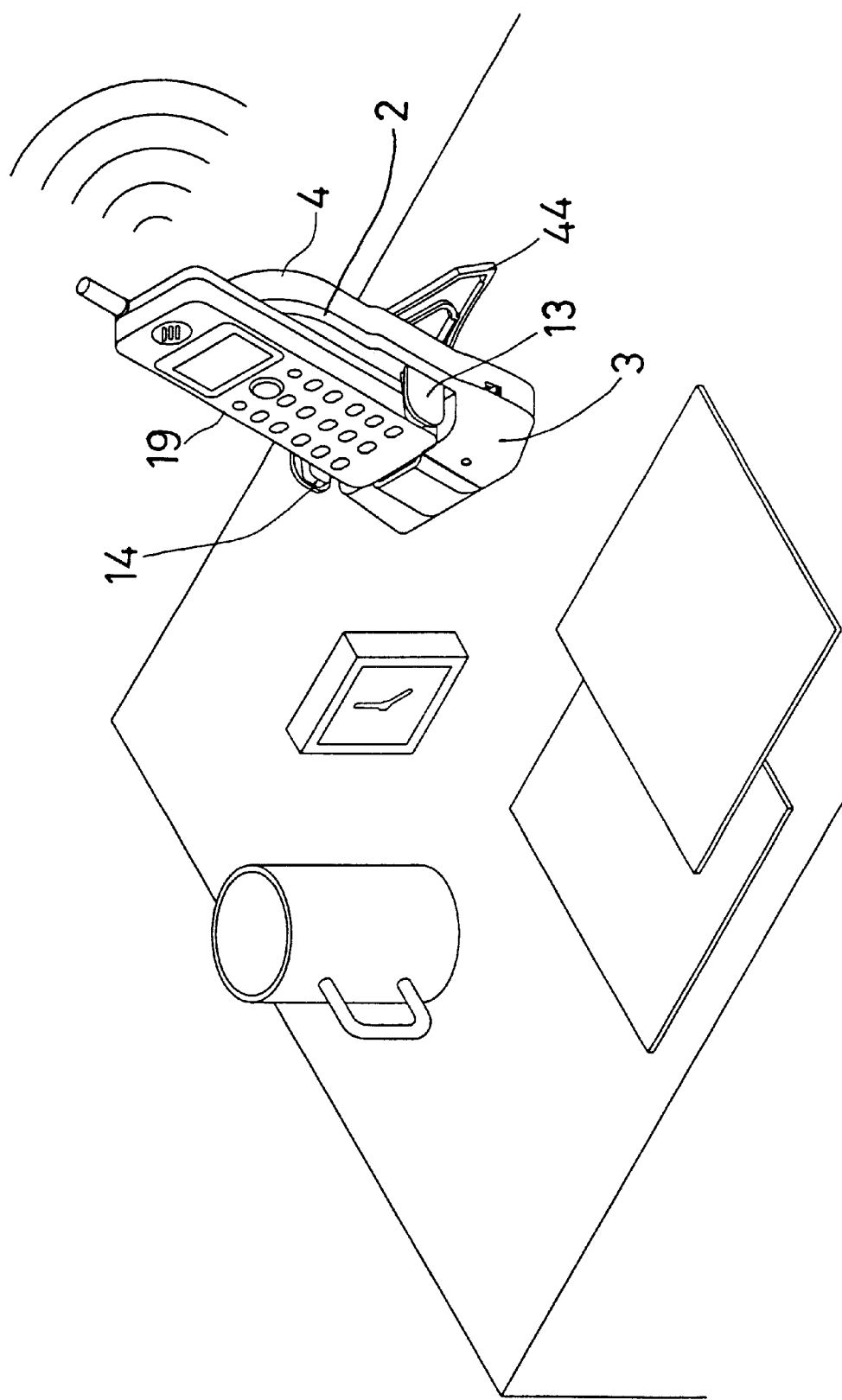
FIGS. 5, 6, 7 are perspective views illustrating the operation of the portable charging device.
Figure 6:
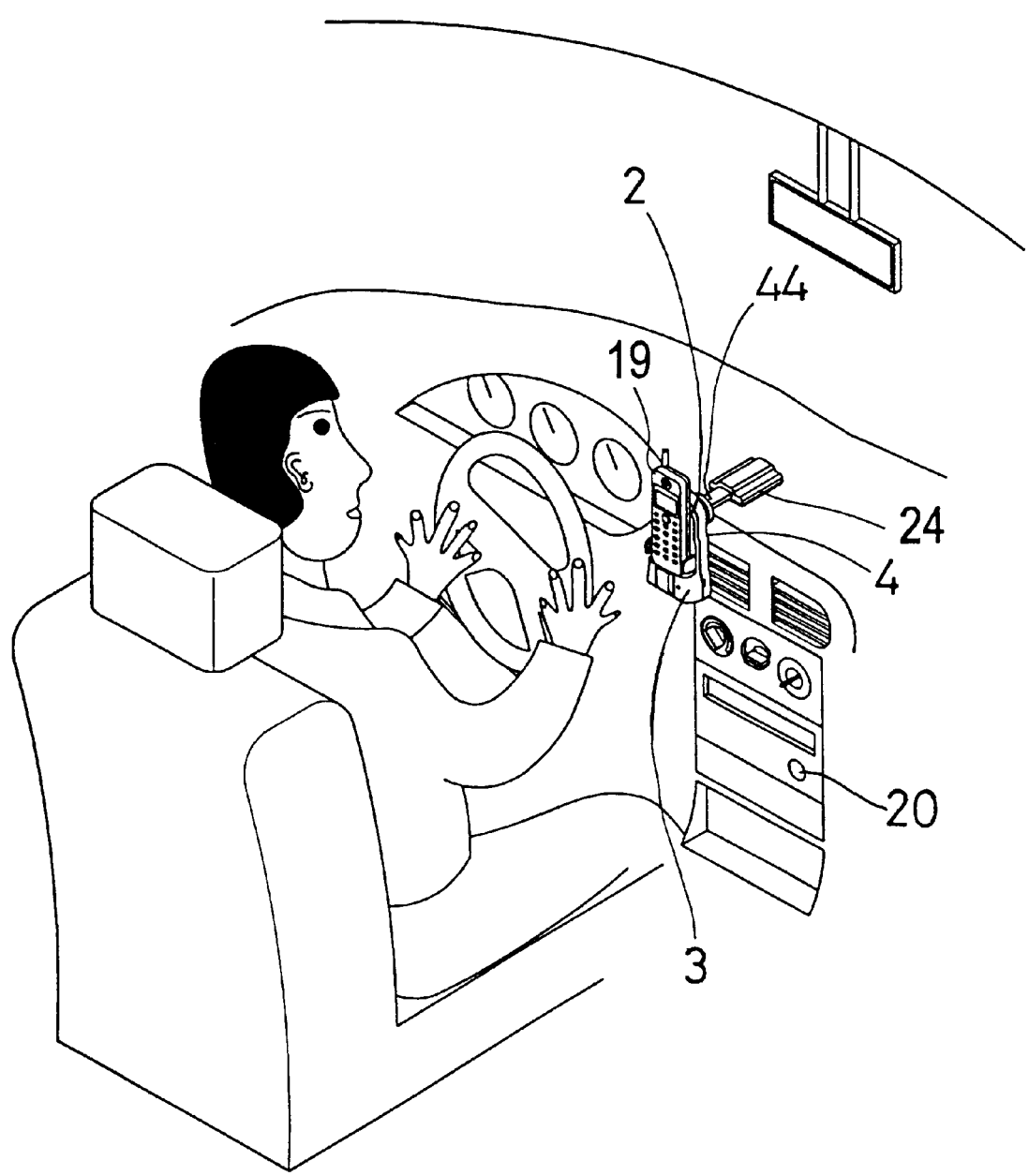
Figure 7:
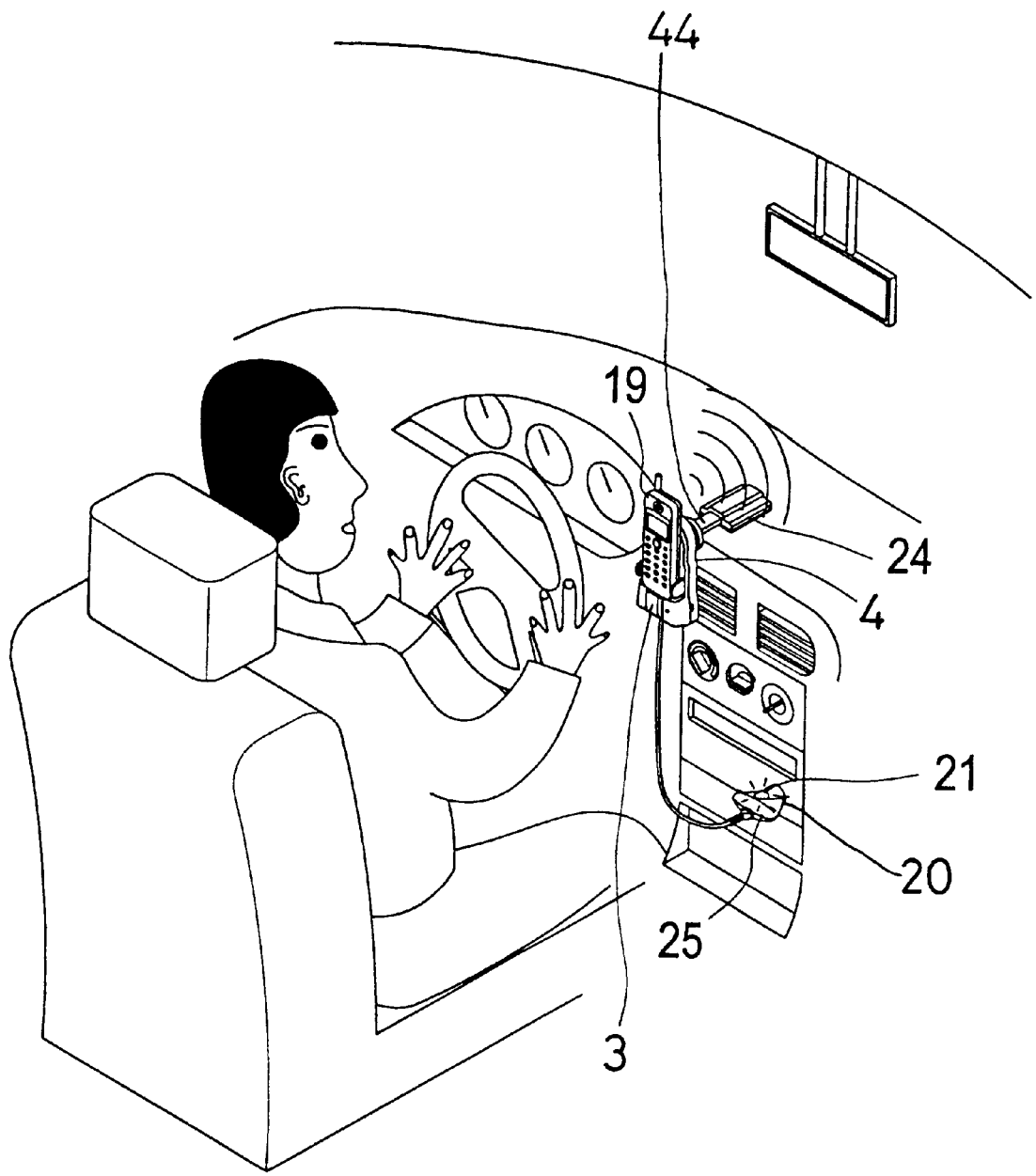

A stay 44 may be rotatably or pivotally secured to the cover 4 with a pivot axle 46, and may be rotated relative to the cover 4 to a position that is perpendicular to the cover 4 (FIGS. 3, 5), and the other position that is parallel to or engaged with the cover 4. A clip 18 may be attached to the stay 44 (FIG. 3), or directly attached to the cover 4 (FIG. 4) for attaching or securing onto the users, such as the waist belt of the users. As shown in FIGS. 6 and 7, a bracket 24 may be secured onto the vehicle, and the stay 44 may be engaged into or secured to the bracket 24 for attaching the portable charging device to the vehicle.

Figure 8:
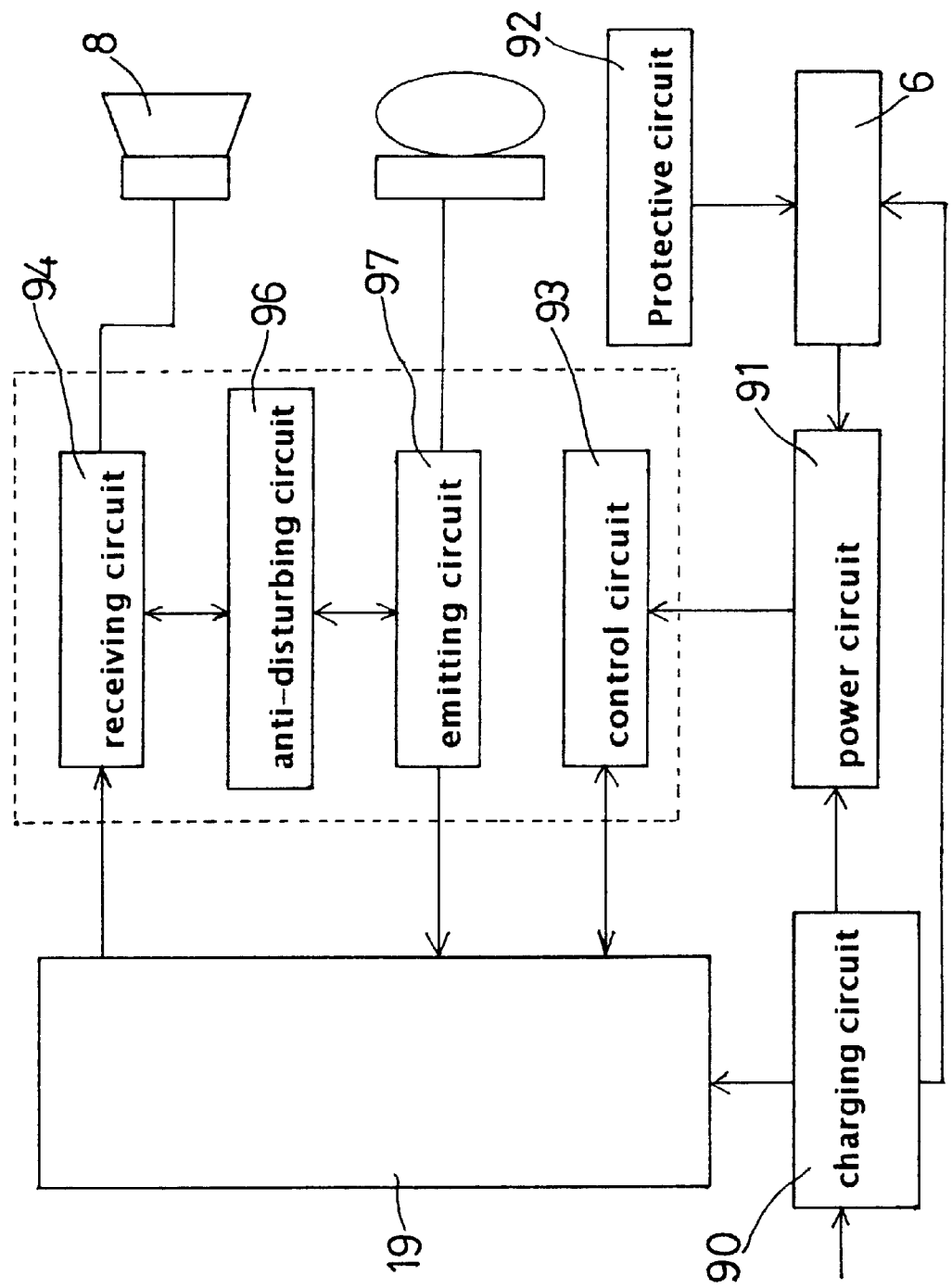
FIG. 8 is a block diagram illustrating the circuits for the portable charging device.

Referring next to FIG. 8, illustrated is an electric circuit for the portable charging device which includes a charging circuit 90 for coupling to the portable or mobile phone 19, and for coupling to the battery 6 via a power circuit 91, for example. A protective circuit 82 may be coupled to the battery 6 for protecting the battery 6. A control circuit 93 is coupled to the power circuit 91 and the portable or mobile phone 19 for controlling the operation of the portable charging device. A receiving circuit 94 is coupled to the mobile phone 19 and coupled to the speaker 8 for allowing the incoming phone to be heard without picking up the mobile phone 19 and without disengaging the mobile phone 19 from the housing 2 and the cover 4. An anti-disturbing circuit 96 and an emitting circuit 97 may be coupled to the mobile phone 19 for speaking the phone. The anti-disturbing circuit 96 may also be coupled to the receiving circuit 94 for suitably receiving the incoming phone.

Figure 4:
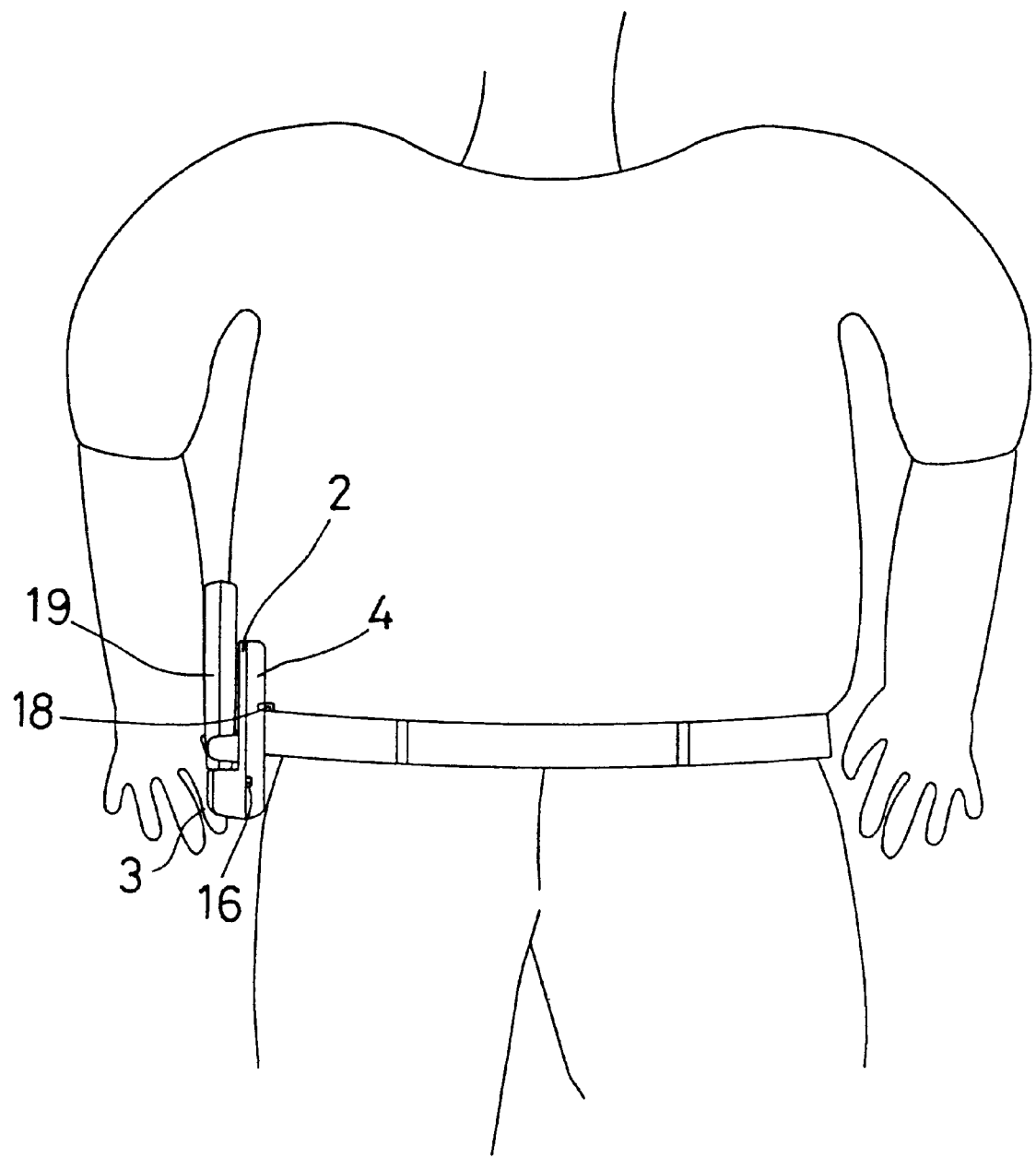

In operation, as shown in FIG. 4, the mobile phone 19 may be engaged in the portable charging device, and carried by the users easily without additional bags or the like. As shown in FIG. 5, the mobile phone 19 may also be engaged in the portable charging device and tiltedly or inclinedly supported on the desk by the portable charging device. As shown in FIG. 6, the mobile phone 19 may also be engaged in the portable charging device and secured in the vehicle by the bracket 24, and/or may be coupled to the socket 20 of the vehicle, as shown in FIG. 7, with the cable and the plug 25.

Accordingly, the portable charging device in accordance with the present invention may be used for receiving and carrying the portable phones or mobile phones, and for allowing the portable phones or mobile phones to be charged at home and in the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A portable charging device for mobile phones, said portable charging device comprising:

a housing including a bottom portion having a seat extended forward therefrom, and two sides each having a flap extended forward therefrom, for forming a space between said seat and said flaps and for receiving the mobile phone, and said housing including at least one prong for plugging to the mobile phone, a circuit board secured in said housing, said circuit board including a socket provided therein, a plug coupled to said socket of said circuit board for plugging and coupling to a power supply of a vehicle, a speaker coupled to said circuit board for generating sound waves, a battery engaged in said housing and coupled to said circuit board for energizing said speaker, a stay pivotally secured to said housing with a pivot axle, for selectively supporting the mobile phone on a supporting surface, and a clip for securing said housing to user.

\* \* \* \* \*